United States Patent
Low et al.

(10) Patent No.: US 9,332,432 B2
(45) Date of Patent: May 3, 2016

(54) METHODS AND SYSTEM FOR DEVICE AUTHENTICATION

(71) Applicant: Yahoo! Inc., Sunnyvale, CA (US)

(72) Inventors: Daryl Low, San Jose, CA (US); Marco Wirasinghe, Sunnyvale, CA (US); Gautam Godse, Monrovia, CA (US)

(73) Assignee: Yahoo! Inc., Sunnyvale, CA (US)

( * ) Notice: Subject to any disclaimer, the term of this patent is extended or adjusted under 35 U.S.C. 154(b) by 113 days.

(21) Appl. No.: 13/958,520

(22) Filed: Aug. 2, 2013

(65) Prior Publication Data

US 2015/0038114 A1    Feb. 5, 2015

(51) Int. Cl.
*H04M 1/66* (2006.01)
*H04W 12/06* (2009.01)
*H04L 29/06* (2006.01)

(52) U.S. Cl.
CPC ............. *H04W 12/06* (2013.01); *H04L 63/107* (2013.01)

(58) Field of Classification Search
CPC ....... H04W 12/06; H04W 12/08; H04W 4/02; H04W 8/18; H04W 64/00
USPC .......................... 455/411, 414.2, 456.1, 456.2
See application file for complete search history.

(56) References Cited

U.S. PATENT DOCUMENTS

| 6,508,710 B1 * | 1/2003 | Paravia et al. ................... 463/42 |
| 8,572,696 B1 * | 10/2013 | Wiacek .............................. 726/4 |
| 2011/0167440 A1 * | 7/2011 | Greenfield ....................... 725/25 |

* cited by examiner

*Primary Examiner* — Temica M Beamer
(74) *Attorney, Agent, or Firm* — Martine Penilla Group, LLP

(57) ABSTRACT

A request is received to access a user account. A geolocation of a mobile device registered with the user account is obtained directly from the mobile device. Authentication credentials for the user account are verified for correctness. A mobile device geolocation verification request is transmitted to a cellular data provider. The cellular data provider is equipped to independently determine a true geolocation region of the mobile device for comparison with the geolocation of the mobile device as obtained directly from the mobile device. A verification response to the mobile device geolocation verification request is received from the cellular data provider. The verification response indicates whether or not the geolocation of the mobile device as obtained directly from the mobile device corresponds to the true geolocation region of the mobile device. A response to the access request based on the verification response is transmitted.

20 Claims, 4 Drawing Sheets

METHODS AND SYSTEM FOR DEVICE AUTHENTICATION

BACKGROUND

Data communication over the Internet has become a common aspect of daily life for millions of people throughout the world. Many companies have established an Internet presence, i.e., web site, through which a user can access services and data provided by the company, and create a secure user account for storage and manipulation of data that is private to the user. The data stored under the protection of a user's secure user account may include sensitive data that is a target of corrupt individuals, such as banking data, personal data, or essentially any other type of sensitive data. Therefore, it is of continuing interest to enhance security measures utilized to protect secure user accounts from unauthorized access. However, the impact of such enhanced security measures on the legitimate user's overall online experience should also be considered. It is within this context that the present invention arises.

SUMMARY

In one embodiment, a method is disclosed for authentication of a request to access a user account. The method includes receiving an access request to access a user account. The access request includes authentication credentials. The method also includes obtaining a geolocation of a mobile device registered with the user account from the mobile device. The geolocation of the mobile device is obtained directly from the mobile device. The method also includes verifying correctness of the authentication credentials for the user account. The method also includes transmitting a mobile device geolocation verification request to a cellular data provider. The cellular data provider is equipped to independently determine a true geolocation region of the mobile device for comparison with the geolocation of the mobile device as obtained directly from the mobile device. The method also includes receiving from the cellular data provider a verification response to the mobile device geolocation verification request. The verification response indicates whether or not the geolocation of the mobile device as obtained directly from the mobile device corresponds to the true geolocation region of the mobile device. The method also includes transmitting a response to the access request based on the verification response.

In one embodiment, a method is disclosed for mobile device authentication. The method includes receiving a mobile device geolocation verification request including an identifier of a mobile device and a unverified geolocation of the mobile device. The method also includes determining a geolocation region of a cell tower to which the mobile device is currently registered. The method also includes comparing the geolocation region of the cell tower to the unverified geolocation of the mobile device to generate a response to the mobile device geolocation verification request. The method also includes providing the response to the mobile device geolocation verification request in reply to the mobile device geolocation verification request.

In one embodiment, a system for authentication of a request to access a user account is disclosed. The system includes a plurality of servers for managing the user account. One or more of the plurality of servers includes logic for receiving an access request to access the user account. The access request includes authentication credentials. The one or more of the plurality of servers also includes logic for obtaining a geolocation of a mobile device registered with the user account from the mobile device. The geolocation of the mobile device is obtained directly from the mobile device. The one or more of the plurality of servers also includes logic for verifying correctness of the authentication credentials for the user account. The one or more of the plurality of servers also includes logic for transmitting a mobile device geolocation verification request to a cellular data provider. The cellular data provider is equipped to independently determine a true geolocation region of the mobile device for comparison with the geolocation of the mobile device as obtained directly from the mobile device. The one or more of the plurality of servers also includes logic for receiving from the cellular data provider a verification response to the mobile device geolocation verification request. The verification response indicates whether or not the geolocation of the mobile device as obtained directly from the mobile device corresponds to the true geolocation region of the mobile device. The one or more of the plurality of servers also includes logic for transmitting a response to the access request based on the verification response.

Other aspects and advantages of the invention will become more apparent from the following detailed description, taken in conjunction with the accompanying drawings, illustrating by way of example the present invention.

DETAILED DESCRIPTION

Figure 1:
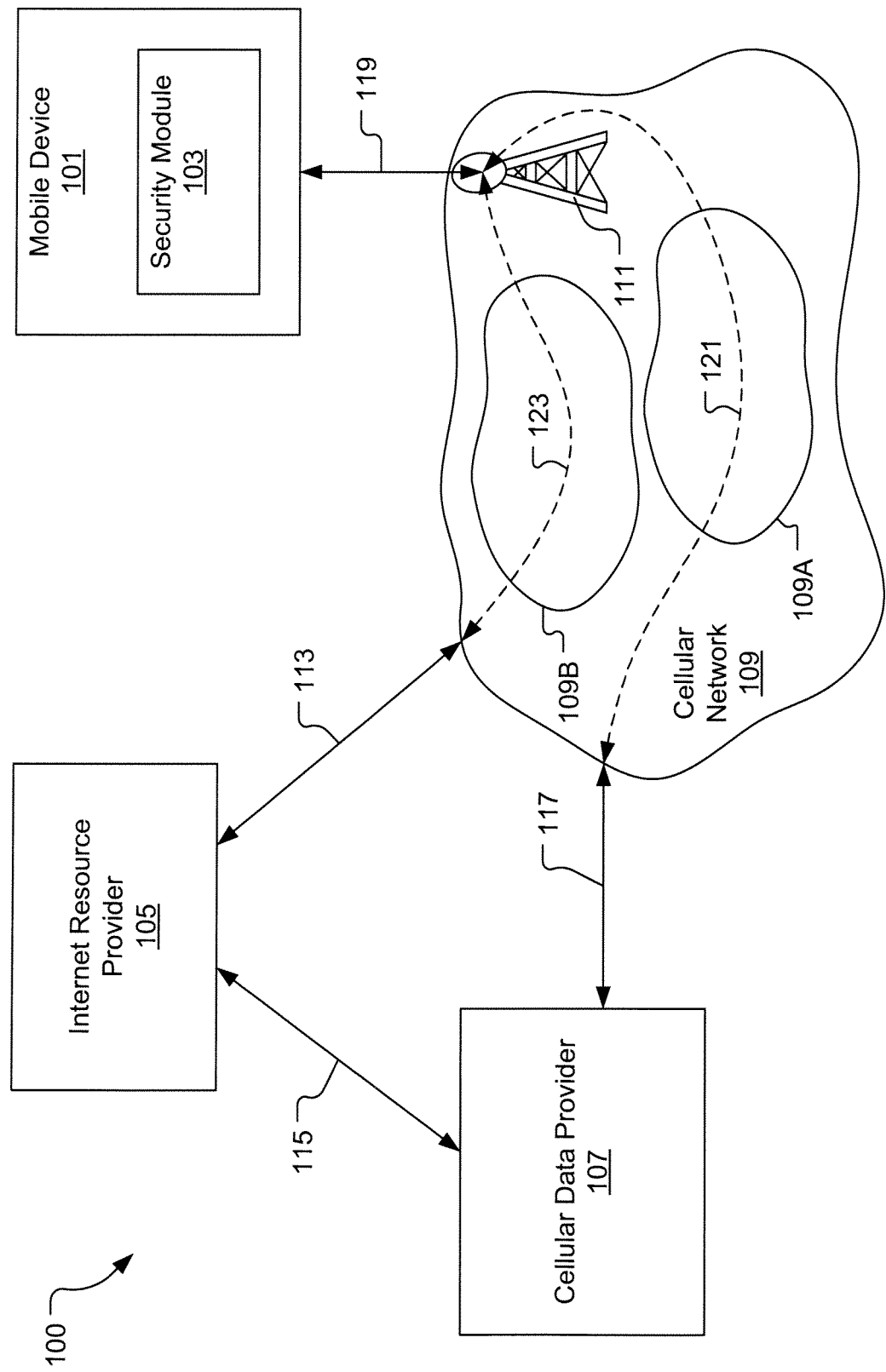
FIG. 1 shows a diagram of a system by which methods disclosed herein can be implemented to provide enhanced mobile device authentication, in accordance with one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Throughout the specification and claims herein, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Yahoo! is an Internet resource provider that provides users with access to a rich collection of resources, including without limitation various communications tools, forums, shopping services, search services, personalized content and branded programming through its network of properties which may be accessed through any various medium or device now known or hereafter developed. While the method and system embodiments disclosed herein for mobile device authentication are applicable to Yahoo! as an Internet resource provider, it should be understood that the embodiments disclosed herein are equally applicable to essentially any other Internet resource provider that provides services to users through secure user accounts. Therefore, the term Internet resource provider as used herein refers to any entity that provides services and/or resources which are accessible through the Internet, of which Yahoo! is an example.

The Internet resource provider is defined to provide for establishment of secure user accounts that are protected by authentication credentials which must be provided by a user in order to access their secure user account and in order to use/associate the services provided by the Internet resource provider with their secure user account. In this manner the user can establish their own secure user account and corresponding authentication credentials with the Internet resource provider for storage of data and customization of the user's online experience with the services provided by the Internet resource provider. The user is able to access their secure user account by providing established authentication credentials to the Internet resource provider, and through a successful verification of the authentication credentials by the Internet resource provider.

For example, when a user wants to do some type of security sensitive activity with the Internet resource provider, the user sends an access request to a server of the Internet resource provider, by way of the Internet. This access request includes the user's authentication credentials for accessing their secure user account. The Internet resource provider's server receives the user's authentication credentials as a set of bits over the network communication connection. The Internet resource provider is tasked with determining whether or not the authentication credentials are correct for the identified user, and for determining whether or not the access request is legitimate. Determining whether or not the authentication credentials are correct for the identified user is relatively straightforward, and includes verifying that the received authentication credentials match the authentication credentials for the identified user as known the Internet resource provider. However, determining whether or not the access request is legitimate is more difficult.

For example, because the user's authentication credentials arrive at the Internet resource provider's server as a set of bits over a communication line, it is conceivable that a corrupt entity may be capable of acquiring and providing the required set of bits over the communication line to pose as the user. In some cases, the corrupt entity may be a compromised computer, i.e., bot, acting as an imposter on behalf of a corrupt individual to transmit authentication credential data to the Internet resource provider's server, in order to obtain secret information known to the true user. Therefore, a security-related objective is to determine whether an access request is coming over the network from a real mobile device or from a botnet of compromised computers. Part of determining whether or not the access request is legitimate includes knowing where the access request came from, i.e., originated, and knowing whether or not the access request came from the actual person that is the true user or from an imposter.

Additionally, the process of determining whether or not the access request is legitimate needs to carefully weigh the magnitude of additional burden placed on the true user beyond provision of the user's authentication credentials. It should be as easy as possible for the true authorized user to log in to their secure user account, and at the same time, as hard as possible for an unauthorized person to log in as an imposter. The authentication credentials generally include a user identifier and a user password. However, these authentication credentials may not be adequate for determining whether or not the access request is legitimate. Some approaches for determining legitimacy of an access request may include requiring the requesting party to respond to a number of security questions. However, this approach may be difficult or frustrating to an honest user requesting access, particularly when the security questions require recollection of answers that were established at a substantial time in the past, and/or when the honest requesting party needs to log in quickly.

In one instance, the process of determining whether or not the access request is legitimate can include the Internet resource provider partnering with an outside vendor to have the outside vendor send SMS (short message service) challenges to the mobile device of requesting party. For example, when a user registers with the Internet resource provider, the user provides a cell phone number. If at any time the Internet resource provider believes that someone is attempting to use the registered user's secure account in a suspicious way, the Internet resource provider will send an SMS message, i.e., text message, including a special code to the cell phone number of the registered user and require the registered user to enter the special code for verification as part of the Internet resource provider's log in process. In this way, the Internet resource provider can at least verify that the person attempting to use the registered user's account has access to the registered user's cell phone.

However, this additional verification process still provides limited assurance that the person attempting to access the registered user's account is legitimate. For example, the person's cell phone may have been stolen, or the cell phone number itself may have been compromised. Also, this type of verification process can be bothersome for the registered user when they are trying to legitimately access there secure user account, because it requires the user to receive a text message then go enter the special code as part of their log in procedure. Therefore, it is of interest to have another way for verifying the legitimacy of a user access request that is more seamless and invisible to the user during their log in procedure.

FIG. 1 shows a diagram of a system 100 by which methods disclosed herein can be implemented to provide enhanced mobile device authentication, in accordance with one embodiment of the present invention. The system 100 includes a mobile device 101, an Internet resource provider 105, a cellular data provider 107, and a cellular network 109. The cellular network 109 includes two primary communication networks: 1) a circuit-switched network 109A, and 2) a packet-switched network 109B. Both the circuit-switched network 109A and the packet-switched network 109B are defined to communicate data to and from the mobile device 101 through a cell tower 111, as indicated by communication connection 119.

The circuit-switched network 109A is defined to carry telephone data and SMS data. The packet-switched network 109B is defined to carry Internet data and TCP/IP (transmission control protocol/Internet protocol) data. In this manner, the cellular data provider 107 is capable of transmitting telephone and SMS data to the mobile device 101, and receiving telephone and SMS data from the mobile device 101, by way of the circuit-switched network 109A, as indicated by communication connections 117, 121, and 119. Similarly, the Internet resource provider 105 is capable of transmitting Internet and TCP/IP data to the mobile device 101, and receiving Internet and TCP/IP data from the mobile device 101, by way of the packet-switched network 109B, as indicated by communication connections 113, 123, and 119. In one embodiment, the cellular data provider 107 is a entity that provides for SMS security, and/or an entity that determines whether or not cell numbers (cell phone number) are valid or invalid. The cellular data provider 107 has access to routing information within the circuit-switched network 109A.

The Internet resource provider 105 is defined to transmit data to and receive data from the cellular data provider 107, as indicated by communication connection 115. And, the cellular data provider 107 is defined to transmit data to and receive data from the Internet resource provider 105, as indicated by the communication connection 115. The communication connection 115 between the Internet resource provider 105 and the cellular data provider 107 can be either a direct connection, or a network connection. However, in either case, the communication connection 115 between the Internet resource provider 105 and the cellular data provider 107 is secured in a manner such that data transmitted over the communication connection 115 cannot be intercepted and/or used by an unauthorized party. For instance, data communicated between the Internet resource provider 105 and the cellular data provider 107 may be encrypted such that only the Internet resource provider 105 and the cellular data provider 107 are able to decrypt and understand the data.

The circuit-switched network 109A has very strict quality of service requirements, whereas the packet-switched network 109B has less strict quality of service requirements. For example, strict quality of service requirements are implemented to avoid broken or interrupted telephone conversations through the circuit-switched network 109A, as such communication activity is quite time-sensitive. However, transmission of Internet data is generally not that time-sensitive, and through use of error correction code and cyclic redundancy check methods, it is possible to handle the occurrence of lost packets within the packet-switched network 109B without adversely impacting the overall Internet data communication experience.

The cellular data provider 107 has access to both the circuit-switched network 109A and the packet-switched network 109B. Therefore, the cellular data provider 107 has access to circuit-switched network 109A information, such as an identity of the cell tower 111 to which the mobile device 101 is currently registered, i.e., connected, as well as a corresponding geographic location of the cell tower 111 and communication range of the cell tower 111. The Internet resource provider 105 has access to the packet-switched network 109B for the purpose of sending data through TCP/IP connections. However, the Internet resource provider 105 does not have access to the circuit-switched network 109A and its associated information. Therefore, the Internet resource provider 105 is not able to independently determine the identity of the cell tower 111 to which the mobile device 101 is currently registered, or the geographic location of cell towers within the cellular network 109. However, through the communication connection 115, the Internet resource provider 105 can work with the cellular data provider 107 to indirectly access cellular network 109 information, such as real-time cell tower registries and cell tower geographic locations.

The mobile device 101 includes information that can be useful in either proving or disproving the legitimacy of an access request received by the Internet resource provider 105 from a registered user associated with the mobile device 101. For example, in one instance, a geographic location (latitude and longitude coordinates), i.e., geolocation, obtained from the mobile device 101 can be used to assist in verifying that the current geolocation of the mobile device 101 is consistent with an expected geolocation of the registered user associated with the access request. However, in using geolocation obtained directly from the mobile device 101, it must be considered that the geolocation data comes over the cellular network 109 to the Internet resource provider 105 as a series of digital bits, which could be subject to corruption by an imposter. Therefore, it is of interest to use other types of less corruptible information, i.e., more trustworthy information, about the mobile device 101 to assist in verifying the legitimacy of a user account access request.

To facilitate the retrieval and transmission of mobile device 101 information to the Internet resource provider 105 for the purpose of authenticating a user account access request, the mobile device 101 is equipped with a security module 103. The security module 103 is defined to direct communication of security-related data from the mobile device 101 to the Internet resource provider 105, and process security-related data received at the mobile device 101 from the Internet resource provider 105. The security Module 103 is also defined to perform security-related operations on the mobile device 101 on behalf of the Internet resource provider 105.

In one embodiment, the Internet resource provider 105 receives from the mobile device 101 both an access request, i.e., log in request, and the current geolocation of the mobile device 101. The Internet resource provider 105 then operates to verify the current geolocation information obtained from the mobile device 101. To do this, the Internet resource provider 105 communicates the current geolocation information of the mobile device 101 that is to be verified to the cellular data provider 107. The cellular data provider 107 is equipped to transmit an SMS "ping" to the mobile device 101 to determine whether or not the mobile device 101 is online.

In one embodiment, the "ping" can be transmitted so as to not travel all the way to the mobile device 101, thereby avoiding notification of the user of the mobile device 101 of the ping activity. For instance, if a given cell tower provider has a database of all mobile devices currently operating within the transmission range of the given cell tower, the "ping" may stop at the server computing system of the cell tower provider when the mobile device identity is found within the registry for the given cell tower. Then, the server computing system of the cell tower provider can provide the identification of the cell tower, within whose range the mobile device is currently operating, back to the cellular data provider 107.

Once the cellular data provider 107 receives the information identifying the cell tower to which the mobile device is currently registered, i.e., the current cell tower, the cellular data provider 107 can determine the geolocation of the current cell tower. Then, the cellular data provider 107 can compare the geolocation of the mobile device 101 as received from the Internet resource provider 105 to the geolocation of the current cell tower to generate a verification result indicating a probability as to whether or not the geolocation of the mobile device 101 as provided by the Internet resource provider 105 is correct. The verification result can then be communicated from the cellular data provider 107 to the Internet resource provider 105. The Internet resource provider 105 then uses this verification result in a security model/algorithm to either allow the access request received from the mobile device 101, disallow the access request, or require further authentication procedures before allowing the access request. If the geolocation of the current cell tower to which the mobile device 101 is registered is sufficiently close to the geolocation obtained from the mobile device 101 with the access request, there is a high level of confidence that the access request is being transmitted from the true mobile device 101 and not from an imposter's computing device. It should be appreciated that a botnet would have to know the current geolocation of the victim's mobile device and the cell tower geolocation associated with the victim's current location to circumvent this authentication process.

Figure 2:
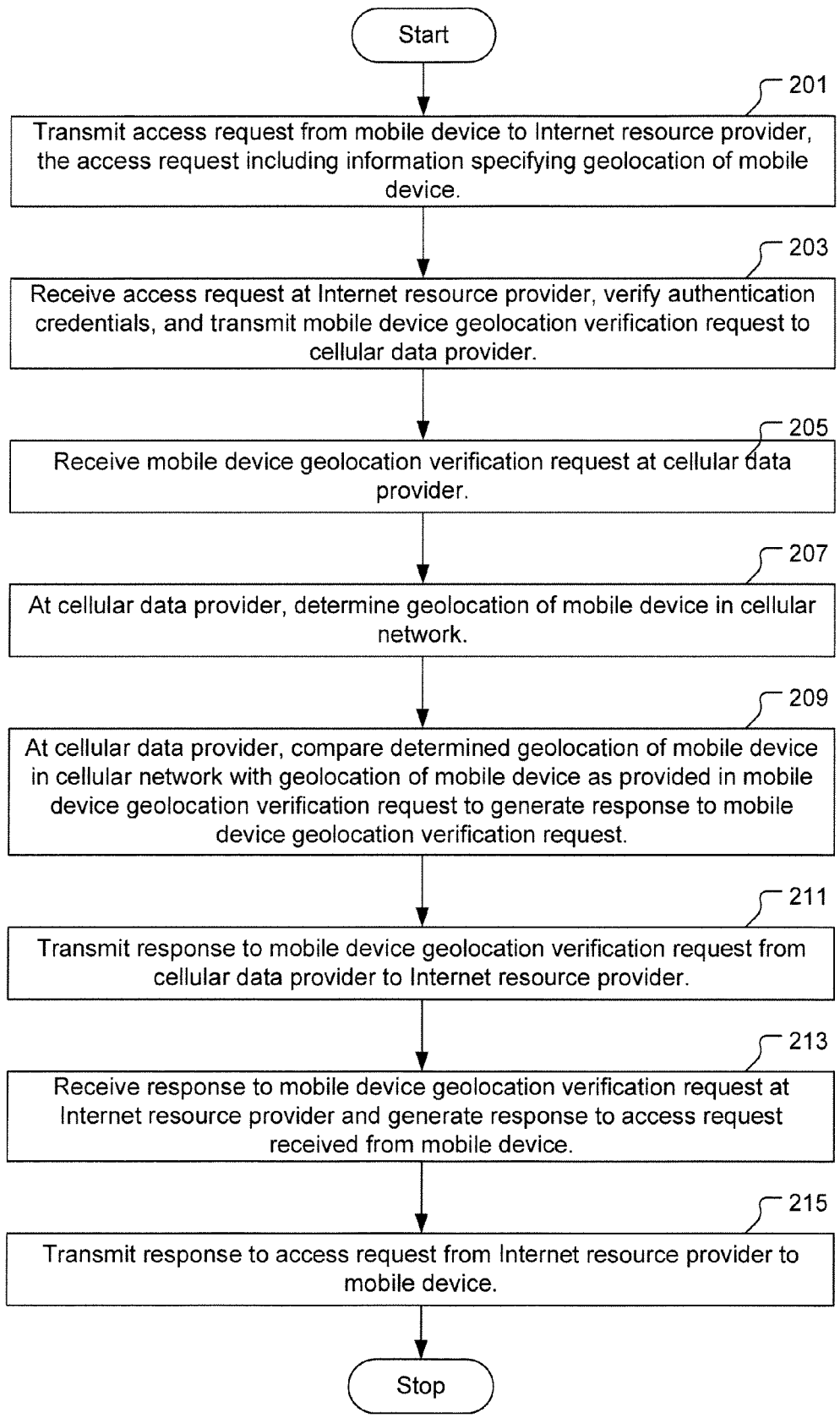
FIG. 2 shows a flowchart of a method for authenticating an access request from a mobile device for access to a secure user account, in accordance with one embodiment of the present invention.

FIG. 2 shows a flowchart of a method for authenticating an access request from a mobile device for access to a secure user account, in accordance with one embodiment of the present invention. The method includes an operation 201 for transmitting the access request from the mobile device 101 to the Internet resource provider 105. The access request includes authentication credentials such as user name and password. The access request also includes information specifying the geolocation of the mobile device 101. In one embodiment, the geolocation of the mobile device 101 is obtained by the security module 103 executing on the mobile device 101. Also, in one embodiment, the security module 103 is operated to obtain the geolocation of the mobile device 101 in a manner hidden from the user of the mobile device 101. In various embodiments, the geolocation of the mobile device 101 can be expressed as latitude and longitude coordinates, cell tower identifier, cell tower information, or essentially any other type of data that indicates a current terrestrial position of the mobile device 101.

The method continues with an operation 203 for receiving the access request at the Internet resource provider 105. Also in operation 203, the Internet resource provider functions to verify the authentication credentials, such as user name and password. And, if the authentication credentials are correct, the operation 203 also includes transmission of a mobile device geolocation verification request from the Internet resource provider 105 to the cellular data provider 107. The mobile device geolocation verification request includes the geolocation of the mobile device 101 to be verified, i.e., the geolocation of the mobile device 101 received with the access request, and the cell number of the mobile device.

In an operation 205, the cellular data provider 107 receives the mobile device geolocation verification request from the Internet resource provider 105. Then, in an operation 207, the cellular data provider 107 operates to determine a current terrestrial location of the mobile device 101 in the cellular network 109. In one embodiment, the cellular data provider 107 has access to cellular network 109 data, such as cellular routing data. Using the cell number provided in the mobile device geolocation verification request, the cellular data provider 107 can transmit a "ping" to the mobile device 101 through the circuit-switched network 109A of the cellular network 109 to determine the current cell tower 111 registration information for the mobile device 101. It should be understood that transmission of the "ping" can include use of many entities within the circuit-switched network 109A portion of the cellular network 109 in order to obtain the current cell tower 111 registration information for the mobile device 101.

Through the circuit-switched network 109A information, the cellular data provider 107 can determine which cell tower 111 is currently communicating with the mobile device 101. Then, from that cell tower 111 registration information, a geolocation of the cell tower 111 can be determined, and in turn a general geolocation of the mobile device 101 can be determined. In one embodiment, determination of which cell tower 111 is currently communicating with the mobile device 101 is done directly by the cellular data provider 107. In another embodiment, determination of which cell tower 111 is currently communicating with the mobile device 101 is done by a third party at the request of the cellular data provider 107.

The method continues with an operation 209 in which the cellular data provider 107 functions to compare the current geolocation of the mobile device 101 within the cellular network 109, as indicated by the currently registered cell tower 111 geolocation, with the geolocation of the mobile device 101 as provided in the mobile device geolocation verification request, to generate a response to the mobile device geolocation verification request. This response is generated to convey an answer as to whether or not the geolocation of the mobile device 101 as provided in the mobile device geolocation verification request is correct.

In one embodiment, the response to the mobile device geolocation verification request is a simple yes or no response, with yes meaning geolocation verified, and with no meaning geolocation not verified. In another embodiment, the response to the mobile device geolocation verification request is a probability that the mobile device 101 geolocation in question corresponds to the determined cell tower 111 geolocation. In this embodiment, the probability of correspondence may be based on comparison of a geographic distance of the mobile device 101 from the cell tower 111 with a communication range of the cell tower 111. More specifically, if the geographic distance between the geolocation of mobile device 101 in question and the geolocation of the cell tower 111 is less than the communication range of the cell tower 111, there is a reasonable probability that geolocation of the mobile device 101 in question is true. And, the closer the geolocation of the mobile device 101 in question is to the geolocation of the cell tower 111, the higher the probability of correspondence, vice-versa. Also, in some embodiments, the probability or correspondence may be weighted by other factors, such as whether or not the mobile device 101 has been in motion relative to the cell tower 111, and/or whether or not the mobile device 101 has been in recent communication with the cell tower 111.

Once the response to the mobile device geolocation verification request is generated by the cellular data provider 107, the method proceeds with an operation 211 for transmitting the response from the cellular data provider 107 to the Internet resource provider 105. In an operation 213, the Internet resource provider 105 receives the response to the mobile device geolocation verification request from the cellular data provider 107, and generates a response to the access request as previously received from the mobile device 101.

Based on the response to the mobile device geolocation verification request, the response to the access request can be to either allow log in, disallow log in, or take further authentication measures. Also, if it is determined that access requestor is an imposter, the response to the access request can be to direct the imposter to another location where they cannot gain the requested access and where the imposter can be lured into divulging information about themselves to facilitate determination of their true identity or location. In one embodiment, the response to the access request is generated by an overall security model, and may be based in-part on comparison of geolocation correspondence probability, as received from the cellular data provider 107, to various threshold values. The method concludes with an operation 215 in which the Internet resource provider 105 transmits the response to the access request to the mobile device 101.

Figure 3:
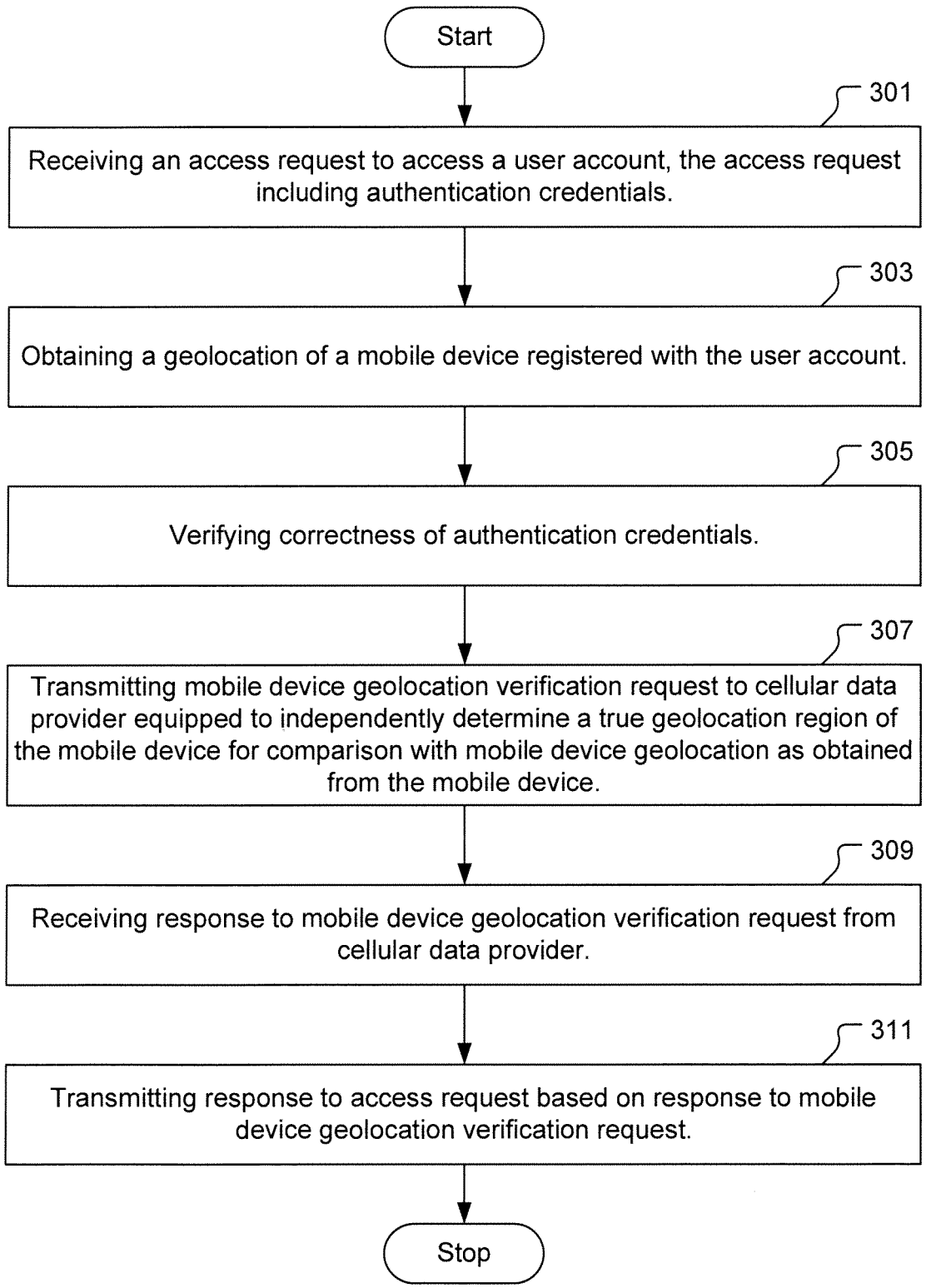
FIG. 3 shows a flowchart of a method for authentication of a request to access a user account, in accordance with one embodiment of the present invention.

FIG. 3 shows a flowchart of a method for authentication of a request to access a user account, in accordance with one embodiment of the present invention. The method includes an operation 301 for receiving an access request to access the user account. The access request includes authentication credentials. In one embodiment, the authentication credentials includes a user name and a password as registered to the user account. In one embodiment, the access request is received from the mobile device. The method also includes an operation 303 for obtaining a geolocation of a mobile device registered with the user account. The geolocation of the mobile device is obtained directly from the mobile device in operation 303. In one embodiment, the geolocation of the mobile device obtained from the mobile device is defined as latitude and longitude coordinates of a current location of the mobile device. In another embodiment, the geolocation of the mobile device obtained from the mobile device is defined as an identification of a cell tower to which the mobile device is currently registered.

The method also includes an operation 305 for verifying correctness of the authentication credentials for the user account. The method also includes an operation 307 for transmitting a mobile device geolocation verification request to a cellular data provider. In one embodiment, operation 307 is performed upon successful verification of the authentication credentials for the user account in operation 305. In one embodiment, the mobile device geolocation verification request includes a cell number of the mobile device and the geolocation of the mobile device obtained directly from the mobile device. The cellular data provider is equipped to independently determine a true geolocation region of the mobile device for comparison with the geolocation of the mobile device as obtained directly from the mobile device. More specifically, the cellular data provider is equipped to access a cellular network to determine a geolocation of a cell tower to which the mobile device is currently registered. In various embodiments, the geolocation of the cell tower is defined as one or more of an identification of the cell tower and latitude and longitude coordinates of the cell tower. However, it should be understood that the geolocation of the cell tower can be defined in other ways in other embodiments, so long as the geolocation of the cell tower is correlated to a terrestrial location of the cell tower. In one embodiment, the true geolocation region of the mobile device is defined as a geographic area over which a communication can be transmitted from the cell tower to which the mobile device is currently registered.

The method also includes an operation 309 for receiving from the cellular data provider a verification response to the mobile device geolocation verification request. The verification response indicates whether or not the geolocation of the mobile device as obtained directly from the mobile device corresponds to the true geolocation region of the mobile device. The verification response indicates whether or not the geolocation of the mobile device obtained directly from the mobile device corresponds to the true geolocation region of the mobile device as determined by the cellular data provider. In one embodiment, the verification response is defined as a probability that the mobile device geolocation obtained directly from the mobile device corresponds to the true geolocation region of the mobile device as determined by the cellular data provider. The method also includes an operation 311 for transmitting a response to the access request based on the verification response.

In one embodiment, the method of FIG. 3 can be implemented by a system for authentication of a request to access a user account. Such a system includes a plurality of servers for managing the user account, where one or more of the plurality of servers includes logic to perform the operations of the method of FIG. 3. In one embodiment, the method of FIG. 3 can be implemented by the system 100 of FIG. 1. In this embodiment, the Internet resource provider 105 includes the plurality of servers for managing the user account, where one or more of the plurality of servers includes logic to perform the operations of the method of FIG. 3.

Figure 4:
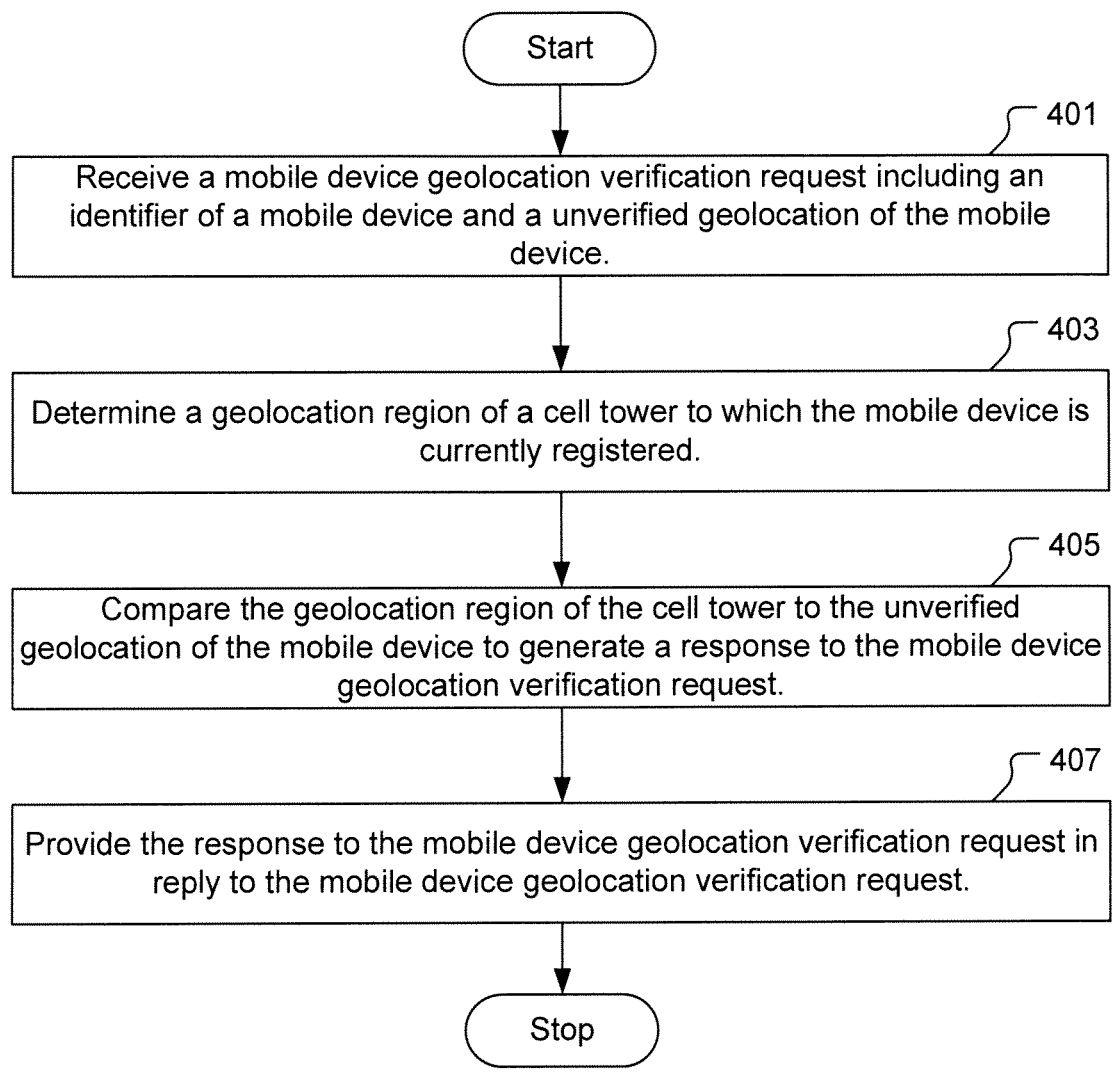
FIG. 4 shows a method for mobile device authentication, in accordance with one embodiment of the present invention.

FIG. 4 shows a method for mobile device authentication, in accordance with one embodiment of the present invention. The method includes an operation 401 for receiving a mobile device geolocation verification request including an identifier of a mobile device and a unverified geolocation of the mobile device. In one embodiment, the identifier of the mobile device is a cell number of the mobile device. In various embodiments, the unverified geolocation of the mobile device is defined as one or more of latitude and longitude coordinates of the mobile device and an identifier of a cell tower to which the mobile device asserts a current connection.

The method also includes an operation 403 for determining a geolocation region of a cell tower to which the mobile device is currently registered. In one embodiment, determining the geolocation region of the cell tower to which the mobile device is currently registered includes transmitting a simple message system (SMS) ping through a cellular network to the mobile device. In one embodiment, SMS ping is hidden from a user of the mobile device. In one embodiment, the geolocation region of the cell tower is defined as a geographic area over which a communication can be transmitted from the cell tower to which the mobile device is currently registered.

The method also includes an operation 405 for comparing the geolocation region of the cell tower to the unverified geolocation of the mobile device to generate a response to the mobile device geolocation verification request. The response to the mobile device geolocation verification request indicates whether or not the unverified geolocation of the mobile device corresponds to the geolocation region of the cell tower to which the mobile device is currently registered. In one embodiment, the response to the mobile device geolocation verification request is defined as a probability that the unverified geolocation of the mobile device corresponds to the geolocation region of the cell tower to which the mobile device is currently registered. The method also includes an operation 407 for providing the response to the mobile device geolocation verification request in reply to the mobile device geolocation verification request.

In one embodiment, the method of FIG. 4 can be implemented by a system for mobile device authentication. Such a system includes a plurality of servers for managing mobile device authentication, where one or more of the plurality of servers includes logic to perform the operations of the method of FIG. 4. In one embodiment, the method of FIG. 4 can be implemented by the system 100 of FIG. 1. In this embodiment, the cellular data provider 107 includes the plurality of servers for managing mobile device authentication, where one or more of the plurality of servers includes logic to perform the operations of the method of FIG. 4.

The system and methods disclosed herein for providing enhanced mobile device authentication offer many advantages. For example, the system and methods disclosed herein provide for verification that network requests are originating from a specific known mobile device and not from either an unknown mobile device or a bot. Therefore, the system and methods disclosed herein provide a strong authentication test by which legitimate users can avoid anti-bot blocks on their secure user account. Also, it should be appreciated that the system and methods disclosed herein leverage the fact that cell phone carriers have strong authentication mechanisms, based on the SIM (subscriber identification module) cards inside mobile devices, to authenticate Internet communications from mobile devices.

It should be understood that any method operations disclosed herein can involve execution of computer-executable instructions and can be performed by software written or otherwise expressed in any suitable programming language or combination of programming languages. In various embodiments, software is expressed as source code or object code. In various embodiments, software is expressed in a higher-level programming language, such as, for example, C, Perl, or a suitable extension thereof. In various embodiments, software is expressed in a lower-level programming language, such as assembly language (or machine code). In various embodiments, software is expressed in JAVA. In various embodiments, software is expressed in Hyper Text Markup Language (HTML), Extensible Markup Language (XML), or other suitable markup language.

It should be further understood that any software for performing any of the operations of the various methods disclosed herein can be recorded as computer readable code on a non-transitory computer-readable storage medium. The non-transitory computer readable storage medium is any data storage device that can store data which can be thereafter be read by a computer system. Examples of non-transitory computer readable storage media include hard drives, network attached storage (NAS), read-only memory, random-access memory, CD-ROMs, CD-Rs, CD-RWs, magnetic tapes, and other optical and non-optical data storage devices. The computer readable code can also be distributed over a network of coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for authentication of a request to access a user account, comprising:
    operating a server to receive an access request to access a user account, the access request including authentication credentials;
    obtaining at the server a geolocation of a mobile device registered with the user account from the mobile device, wherein the geolocation of the mobile device is obtained directly from the mobile device;
    operating the server to verify correctness of the authentication credentials for the user account;
    operating the server to transmit a mobile device geolocation verification request to a cellular data provider, the cellular data provider equipped to independently determine a true geolocation region of the mobile device for comparison with the geolocation of the mobile device as obtained directly from the mobile device;
    receiving at the server from the cellular data provider a verification response to the mobile device geolocation verification request, the verification response indicating whether or not the geolocation of the mobile device as obtained directly from the mobile device corresponds to the true geolocation region of the mobile device; and
    operating the server to transmit a response to the access request based on the verification response.

2. A method for authentication of a request to access a user account as recited in claim 1, wherein the access request is received from the mobile device.

3. A method for authentication of a request to access a user account as recited in claim 1, wherein the geolocation of the mobile device obtained from the mobile device is defined as latitude and longitude coordinates of a current location of the mobile device.

4. A method for authentication of a request to access a user account as recited in claim 1, wherein the geolocation of the mobile device obtained from the mobile device is defined as an identification of a cell tower to which the mobile device is currently registered.

5. A method for authentication of a request to access a user account as recited in claim 1, wherein transmitting the mobile device geolocation verification request is done upon successful verification of correctness of the authentication credentials for the user account.

6. A method for authentication of a request to access a user account as recited in claim 1, wherein the mobile device geolocation verification request includes a cell number of the mobile device and the geolocation of the mobile device obtained directly from the mobile device.

7. A method for authentication of a request to access a user account as recited in claim 1, wherein the cellular data provider is equipped to access a cellular network to determine a geolocation of a cell tower to which the mobile device is currently registered, wherein the geolocation of the cell tower is defined as one or more of an identification of the cell tower and latitude and longitude coordinates of the cell tower.

8. A method for authentication of a request to access a user account as recited in claim 7, wherein the true geolocation region of the mobile device is defined as a geographic area over which a communication can be transmitted from the cell tower to which the mobile device is currently registered.

9. A method for authentication of a request to access a user account as recited in claim 1, wherein the verification response indicates whether or not the geolocation of the mobile device obtained directly from the mobile device corresponds to the true geolocation region of the mobile device as determined by the cellular data provider.

10. A method for authentication of a request to access a user account as recited in claim 9, wherein the verification response is defined as a probability that the mobile device geolocation obtained directly from the mobile device corresponds to the true geolocation region of the mobile device as determined by the cellular data provider.

11. A method for mobile device authentication, comprising:
    operating a server to receive a mobile device geolocation verification request including an identifier of a mobile device and a unverified geolocation of the mobile device;
    operating the server to direct performance of a process to determine a geolocation region of a cell tower to which the mobile device is currently registered;
    operating the server to compare the geolocation region of the cell tower to the unverified geolocation of the mobile device to generate a response to the mobile device geolocation verification request; and
    operating the server to provide the response to the mobile device geolocation verification request in reply to the mobile device geolocation verification request.

12. A method for mobile device authentication as recited in claim 11, wherein the identifier of the mobile device is a cell number of the mobile device.

13. A method for mobile device authentication as recited in claim 11, wherein the unverified geolocation of the mobile device is defined as one or more of latitude and longitude coordinates of the mobile device and an identifier of a cell tower to which the mobile device asserts a current connection.

14. A method for mobile device authentication as recited in claim 11, wherein determining the geolocation region of the cell tower to which the mobile device is currently registered includes transmitting a simple message system ping through a cellular network to the mobile device.

15. A method for mobile device authentication as recited in claim 14, wherein the simple message system ping is hidden from a user of the mobile device.

16. A method for mobile device authentication as recited in claim 11, wherein the geolocation region of the cell tower is defined as a geographic area over which a communication can be transmitted from the cell tower to which the mobile device is currently registered.

17. A method for mobile device authentication as recited in claim 11, wherein the response to the mobile device geolocation verification request indicates whether or not the unverified geolocation of the mobile corresponds to the geolocation region of the cell tower to which the mobile device is currently registered.

18. A method for mobile device authentication as recited in claim 17, wherein the response to the mobile device geolocation verification request is defined as a probability that the unverified geolocation of the mobile device corresponds to the geolocation region of the cell tower to which the mobile device is currently registered.

19. A system for authentication of a request to access a user account, comprising:
 a plurality of servers for managing the user account, wherein one or more of the plurality of servers include logic for,
 receiving an access request to access the user account, the access request including authentication credentials,
 obtaining a geolocation of a mobile device registered with the user account from the mobile device, wherein the geolocation of the mobile device is obtained directly from the mobile device,
 verifying correctness of the authentication credentials for the user account,
 transmitting a mobile device geolocation verification request to a cellular data provider, the cellular data provider equipped to independently determine a true geolocation region of the mobile device for comparison with the geolocation of the mobile device as obtained directly from the mobile device,
 receiving from the cellular data provider a verification response to the mobile device geolocation verification request, the verification response indicating whether or not the geolocation of the mobile device as obtained directly from the mobile device corresponds to the true geolocation region of the mobile device, and
 transmitting a response to the access request based on the verification response.

20. A system for authentication of a request to access a user account as recited in claim 19, wherein the access request is received from the mobile device.

\* \* \* \* \*